United States Patent [19]
Xiao

[11] Patent Number: 5,670,727
[45] Date of Patent: Sep. 23, 1997

[54] STRINGED INSTRUMENT PRACTICE BOW GUIDE

[76] Inventor: Xiaoda Xiao, 135 Belchertown Rd., Amherst, Mass. 01002

[21] Appl. No.: 647,709

[22] Filed: May 14, 1996

[51] Int. Cl.⁶ .................................................. G01D 1/02
[52] U.S. Cl. .................................................. 84/283
[58] Field of Search .......................... 84/281, 282, 283, 84/325, 465

[56] References Cited

U.S. PATENT DOCUMENTS

| | | | |
|---|---|---|---|
| 1,275,222 | 8/1918 | Becker | 126/273.5 |
| 2,239,579 | 4/1941 | Solodar | 84/283 |
| 4,554,859 | 11/1985 | Hanly | 84/283 |
| 5,355,757 | 10/1994 | Plummer | 84/283 |

*Primary Examiner*—Michael L. Gellner
*Assistant Examiner*—Shih-yung Hsieh
*Attorney, Agent, or Firm*—Malcolm J. Chisholm, Jr.

[57] ABSTRACT

A stringed instrument practice bow guide is disclosed for assisting a student of stringed instruments in learning proper movement of a bow of the stringed instrument without aggravating noise caused by improper string crossings. In a particular embodiment the stringed instrument practice bow guide includes a board having a finger end and an opposed brace end; a frame removably affixed to the board; and, a bow track defining a bow passage for slidably securing the bow. The bow track is pivotally secured to the frame so that the bow passage is in a fixed, right-angle relationship with respect to a longitudinal axis of the board and adjustably pivots with respect to a transverse axis of the board. A pivot arm extends between the bow track and the frame to secure the bow track in a plurality of fixed positions relative to the transverse axis of the board. In a preferred embodiment, the bow track further includes a support housing that supports the bow and an enclosure housing pivotally secured to the support housing that cooperates with the support housing to define the bow passage, and the pivot arm includes a plurality of positioning notches that separately engage a frame strut to secure the bow track in one of the fixed positions. In use of the practice bow guide, the movement of the bow within the bow passage is constrained by the bow track depending upon the position of the bow track selected by the student.

19 Claims, 2 Drawing Sheets

STRINGED INSTRUMENT PRACTICE BOW GUIDE

TECHNICAL FIELD

The present invention relates to devices for practicing stringed instruments, and especially relates to a stringed instrument practice bow guide for assisting a student of stringed instruments in practicing proper movement of a bow of a stringed instrument.

BACKGROUND OF THE INVENTION

Learning to play a stringed instrument such as a violin involves repeated practice by a student of movement of a bow of the stringed instrument. Until the student has mastered proper movement of the bow, practice to develop proper movement generates aggravating sounds from the stringed instrument. For new students of stringed instruments especially, such aggravating sounds can be a severe limitation on the ability of the student to sustain productive, long practice sessions, and may force such students to develop improper movements of the bow.

Proper movement of the bow requires that the student maintain the bow in a specific alignment with respect to two spatial planes. For convenience, a first plane will be referred to herein as a "stroke plane", and it is defined as a plane that is perpendicular to a longitudinal axis of a string of the stringed instrument. A second plane will be referred to herein for convenience as a "string contact plane", and it is defined as a plane that is both parallel to the longitudinal axis of a specific string of the stringed instrument and is also aligned so that the string contact plane contacts only that specific string and not the other strings. The strings of stringed instruments that use a bow are arranged on a bridge that has a convex string support surface relative to a body of the stringed instrument. For example, if a stringed instrument such as a violin has four strings (e.g., an "E-string", "A-string", "D-string" and a "G-string"), then because the four strings are supported at different positions on the convex string support surface of the bridge, each string has a string contact plane that is parallel to a longitudinal axis of that string and does not contact any other string. Therefore, a bow moving within the string contact plane of that string will contact only that string and will not contact the other three strings.

Failure of students of stringed instruments to maintain the bow within the string contact and stroke planes of a particular string is largely responsible for the bow prematurely leaving contact with the particular string; contacting an incorrect string; or, for the bow simultaneously contacting more than one string unnecessarily. Such circumstances are generally and hereinafter characterized as improper string crossings and produce the aggravating and unacceptable sounds typical of new students of stringed instruments that limit the productivity and duration of their practice sessions. By repeated practice however, the students will acquire the skill necessary to maintain proper movement of the bow so that it remains within the string contact and stroke planes of a particular string for a desired duration, and thereby produces correct sounds.

Various devices have been developed to help students of stringed instruments learn proper bow movement without the ordinary aggravating sounds. For example, a "violinist's practice device" is disclosed in U.S. Pat. No. 1,275,202 issued in 1918 to Becker that includes a support bar having finger plungers at one end and a chin support at an opposed end and a bow guide on the support bar having a slot and a step with rounded surfaces similar to a concave surface of a bridge of a violin. A student slides a bow-like rod along the slot or step to mimic the motion of moving a real bow. The sides of the slot and shoulder of the step serve to limit movement of the bow-like device to a stroke plane, however nothing in Becker constrains the bow-like device within a string contact plane of any strings.

In 1985, U.S. Pat. No. 4,554,859 was issued to Hanly for a "bow stroke simulator" which includes a tube secured to a strap that goes around a body of a stringed instrument under its strings adjacent a bridge of the stringed instrument so a student may slide a rod or dowel through the tube. While the tube enables the user to use a real stringed instrument without aggravating noises during practice, the tube is not free to move so the student may slide the dowel in a string contact plane of at most one string, and cannot practice moving from a string contact plane of one string to that of another.

More recently, U.S. Pat. No. 5,355,757 issued in 1994 to Plummer and discloses a "string instrument bowing practice device" that includes a cylindrical tube or sleeve for guiding a shaft in a fixed angle relative to a longitudinal axis of a string. The sleeve includes coaxial "O-rings" that secure the sleeve to the string. The tube does not secure the shaft within a stroke axis of a string however, and, as with Becker and Hanly, a student would have to use an artificial bow to use Plummer's device, and movement of the shaft is not constrained within a string contact plane of any specific string.

Accordingly, it is a general object of the present invention to provide a stringed instrument practice bow guide that overcomes the deficiencies of the prior art.

It is a more specific object to provide a stringed instrument practice bow guide that constrains movement of a bow moving through the guide within a stroke and string contact plane of a specific string.

It is a further object to provide a stringed instrument practice bow guide that enables a student to readily move from a string contact plane of one string to a string contact plane of another string while maintaining the arms of the student in a playing position.

It is another object to provide a stringed instrument practice bow guide that enables a student to use an actual stringed instrument bow within the guide.

It is yet another object to provide a stringed instrument practice bow guide that is readily adaptable to different stringed instruments and to students of different ages, from children to adults.

It is a further object to provide a stringed instrument practice bow guide that will assist an accomplished player of stringed instruments focus specifically on bow speed, string crossings, and on bow stroke distribution.

The above and other advantages of this invention will become more readily apparent when the following description is read in conjunction with the accompanying drawings.

SUMMARY OF THE INVENTION

A stringed instrument practice bow guide is disclosed for assisting students of stringed instruments in learning proper movement of a bow of the stringed instrument without aggravating noise caused by improper string crossings. In a particular embodiment the stringed instrument practice bow guide comprises a board having a finger end and an opposed brace end; a frame removably affixed to the board; a bow track defining a bow passage for slidably securing the bow, the bow track being pivotally secured to the frame so that the bow passage is in a fixed, right-angle relationship with respect to a longitudinal axis of the board and adjustably pivots with respect to a transverse axis of the board; and a pivot arm extending between the bow track and the frame to secure the bow track in a plurality of fixed positions relative to the transverse axis of the board. In a preferred embodiment, the bow track further includes a support housing that supports the bow and an enclosure housing removably secured to the support housing that cooperates with the support housing to define the bow passage; and the pivot arm includes a plurality of positioning notches that separately engage a frame strut to secure the bow track in one of the fixed positions.

In use of the preferred embodiment of the stringed instrument practice bow guide of the present invention, a student of stringed instruments, such as a violin, secures a bow within the bow passage of the bow track; engages a first positioning notch of the pivot arm with the frame strut; places the brace end of the board between the student's chin and left shoulder (assuming the student is right-handed); holds the finger end of the board in the student's left hand; and, slides the bow with a right hand and arm back and forth through the bow passage as a form of practice of bow movement in a first position. By engaging a second positioning notch of the pivot arm with the frame strut, the student pivots the bow passage of the bow track relative to a transverse axis of the board so that the student may then practice bow movement through the bow passage in a second position.

Because the bow track is secured in a fixed, right-angle relationship with the longitudinal axis of the board, the bow passage constrains movement of the bow so that the student's back and forth movement of the bow is perpendicular to the longitudinal axis of board. For purposes herein, maintaining movement of a bow of a stringed instrument perpendicular to a longitudinal axis of the board or of a string of a stringed instrument will be referred to as maintaining the bow within a stroke plane of the board or string. The positioning notches of the pivot arm are arrayed along the pivot arm so that the bow passage of the bow track constrains movement of the bow within what will be referred to herein as a series of specific guide contact planes that approximate string contact planes of a stringed instrument. A string contact plane is defined as a plane that is both parallel to a longitudinal axis of a particular string of a stringed instrument, and is also aligned so that the string contact plane contacts only that specific string and not other strings of the stringed instrument.

When the student has set the first positioning notch to engage the frame strut, the bow passage constrains movement of the bow within a first guide contact plane and the stroke plane. When the student moves the pivot arm by direct adjustment of by pivoting the bow track so that the second positioning notch engages the frame strut, the bow passage then constrains movement of the bow within a second guide contact plane and the stroke plane. If the stringed instrument bow practice guide is configured to assist a student in learning proper bow movement for four strings of a violin for example, the positioning notches would be arrayed so that the various positions attainable by the bow passage of the bow track constrain movement of the bow to approximate proper stroke and string contact planes of the four strings of the violin. In that manner, the student may practice by repeating the proper movements for each string, and quickly move between proper movements for each of the strings by simply moving the pivot arm to engage different positioning notches in the frame strut.

DESCRIPTION OF PREFERRED EMBODIMENTS

Figure 1:
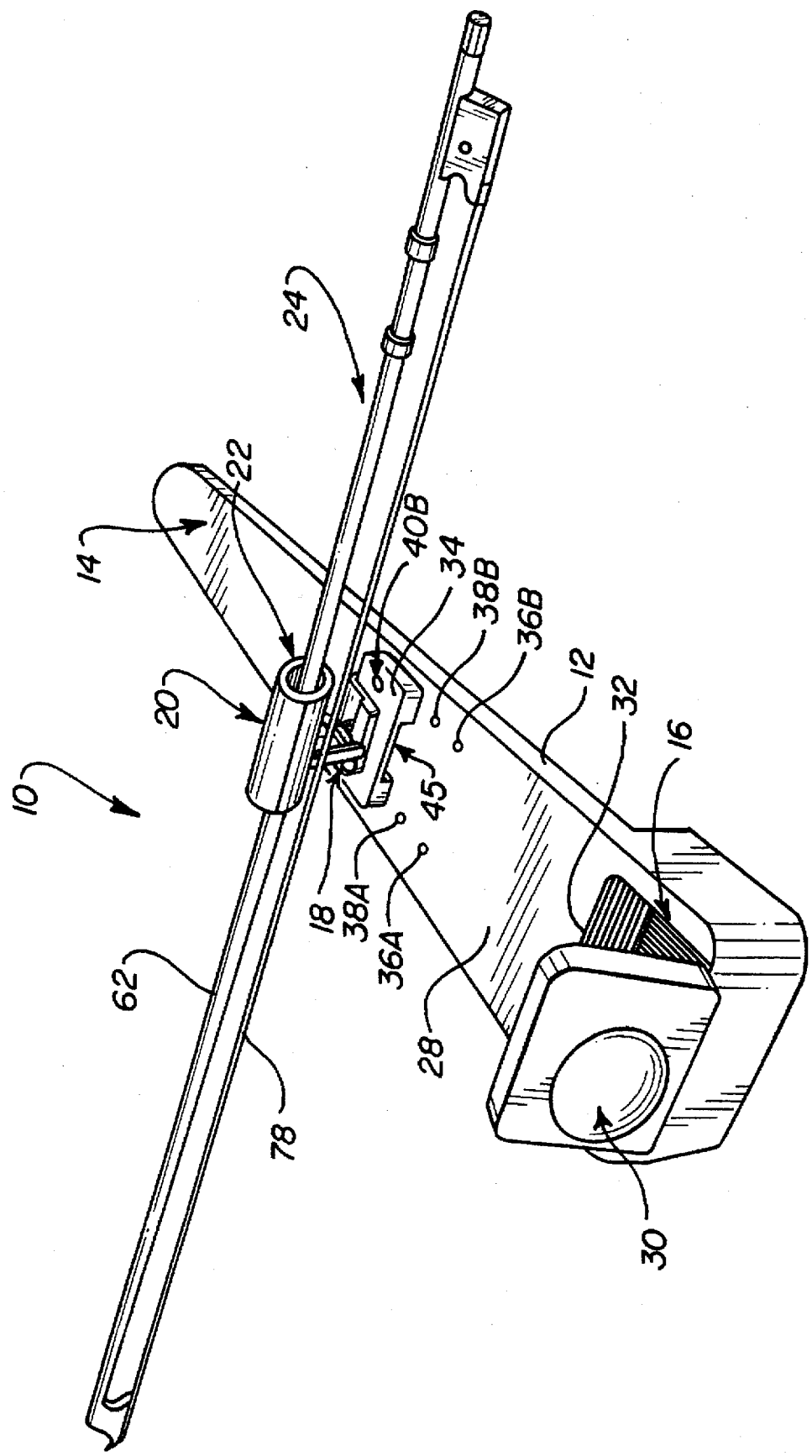
FIG. 1 is a perspective view of a stringed instrument practice bow guide constructed in accordance with the present invention.
Figure 2:
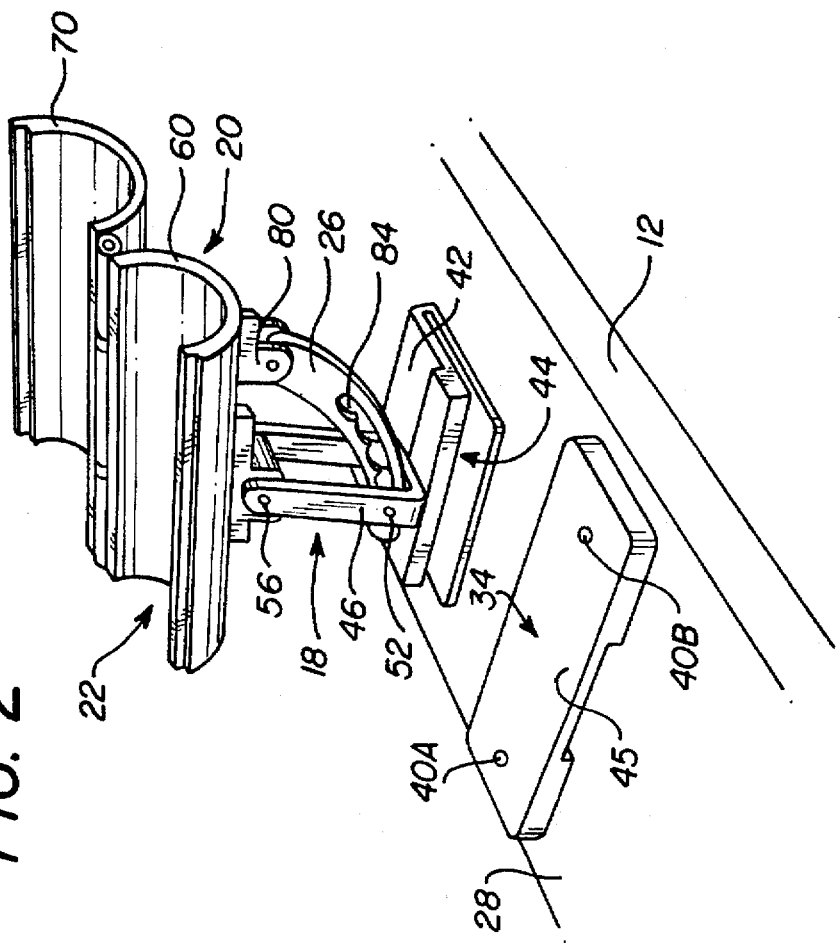
FIG. 2 is a partial view of a stringed instrument practice bow guide showing a bow track of the bow guide in an open position.

Referring to the drawings in detail, a preferred embodiment of the stringed instrument practice bow guide is shown and generally designated by the reference numeral 10. As best seen in FIGS. 1 and 2, the stringed instrument practice bow guide 10 basically comprises a board 12 having a finger end 14 and an opposed brace end 16; a frame 18 removably affixed to the board 12; a bow track 20 that defines a bow passage 22 for slidably securing a bow 24 (shown only in FIGS. 1 and 4) of a stringed instrument (not shown), the bow track 20 being pivotally secured to the frame 18 so that the bow passage 22 is in a fixed, right-angle relationship with respect to a longitudinal axis of the board 12 and the bow passage 22 adjustably pivots with respect to a transverse axis of the board 12; and, a pivot arm 26 extending between the bow track 20 and the frame 18 that secures the bow track 20 in a plurality of fixed positions relative to the transverse axis of the board 12. For purposes herein, the longitudinal axis of the board 12 is defined as running between the finger end 14 and the brace end 16 of the board 12, and the transverse axis is defined as being perpendicular to the longitudinal axis and parallel to an upper surface 28 of the board 12.

Figure 3:
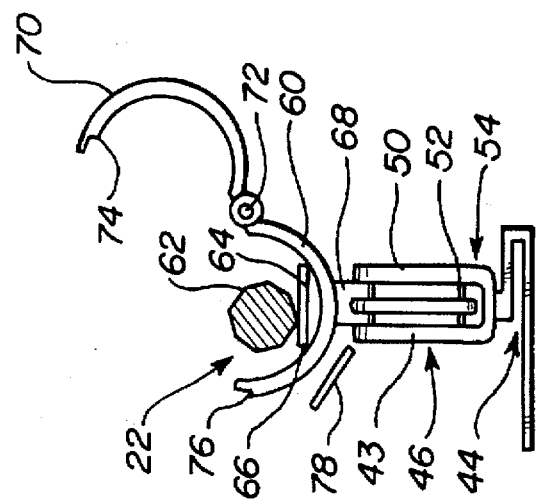
FIG. 3 is a side plan view of a frame and bow track of the FIG. 1 stringed instrument practice bow guide.
Figure 4:
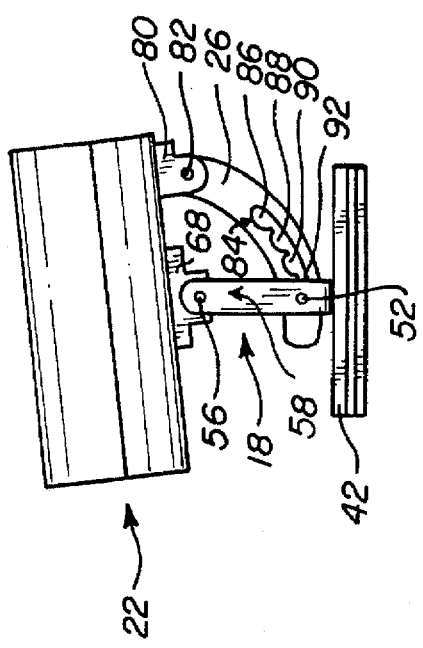
FIG. 4 is a cross-sectional view of a frame and bow track of the FIG. 1 stringed instrument practice bow guide, showing the bow track in an open position and a bow of a stringed instrument within the bow guide.

As best seen in FIG. 1, the board 12 may also include a chin depression 30 adjacent the brace end 16 of the board 12, and a track storage box 32 may be defined within the brace end 16 for storing the frame 18 and bow track 20. The board 12 may be fabricated of a variety of common materials such as wood or modern plastics. A frame mounting bracket 34 is secured to the upper surface 28 of the board, and is adjustable between a plurality of paired mounting holes 36A, 36B, 38A, 38B (shown in FIG. 1) by mounting screws 40A, 40B so the stringed instrument practice bow guide 10 may be adjusted to fit students (not shown) having different arm lengths. A frame means adjustably secures the bow track 20 to the board 12, such as frame 18 as best seen in FIGS. 2–4. Frame 18 includes a base plate 42 that defines a base plate slot 44 that removably secures the frame to a reversible receiving bar 45 of the mounting bracket 34. The reversible receiving bar 45 may engage the base plate slot 44 from either the finger end 14 (as shown in FIGS. 1 and 2) or the brace end 16 of the board 12 so that the frame 18 may be reversed to accommodate both right and left-handed students of stringed instruments. A "U"-shaped track mount 46 is secured to the base plate 42 and includes a first arm 48 and a second arm 50 and a frame strut 52 secured between the first and second arms 46, 46 at a lower end 54 of the track mount adjacent the base plate 42. A first pivot rod 56 passes through the first and second arms 48, 50 at an upper end 58 of the track mount 46 opposed to its lower end 54. The frame 18 may be fabricated of any of a variety of common materials ordinarily used for small, frame-like structures such as aluminum or steel alloys, or may be made of modern plastics.

A bow track means slidably secures the bow 24 to the practice bow guide 10 such as bow track 20. Bow track 20 defines bow passage 22 and, as best seen in FIGS. 2–4, includes an arcuate-shaped support housing 60 for supporting a rod 62 of the bow 24 on a slide roller 64 within the support housing. The slide roller 64 is supported by a roller axle 66 and the slide roller 64 and its axle 66 may comprise any of a variety of common rubber or elastomeric substances well known in the art for reducing friction between the slide roller 64 and its support axle 66 is minimized as movement of the rod 62 rolls the slide roller 64. A bow track bracket 68 is secured to the support housing 60 and it defines a mount throughbore (not shown) through which the first pivot rod 56 passes to pivotally secure the support housing 60 to the track mount 46. An arcuate-shaped enclosure housing 70 is adjustably secured by a housing pivot pin 72 to the support housing 60 and may be secured by a pressure clasp 74 to a clasp receiver 76 so that the support housing 60 and enclosure housing 70 close to form a cylinder-shaped bow passage 22 within the housings 60, 70, as shown in FIGS. 1 and 3. When the enclosure housing 70 is pivoted away from the support housing 60, the bow track 20 is open, and contact fibers 78 of the bow 24 may be positioned outside of the support housing 60 to remain outside the bow passage 22 when the enclosure housing 70 is again closed, as shown in FIG. 1. The bow track 20 may be fabricated of any of a variety of common materials such as aluminum or steel alloys, or preferably of modern plastics such as ABS plastic commonly used to from cylindrical tubing.

The bow track 20 also includes a pivot arm bracket 80 positioned in alignment with the bow track bracket 68 along a longitudinal axis of the bow passage 22. The longitudinal axis of the bow passage is defined for purposes herein as an axis that is parallel to a direction the bow 24 will pass as it slides back and forth through the bow passage 22. The pivot arm bracket 80 secures a second pivot rod 82 that pivotally secures the pivot arm 26 to the bow track 20.

A pivot means adjustably secures the bow track 20 to the frame 18 in a variety of fixed positions, such as pivot arm 26. Pivot arm 26 defines a notch cavity 84 through which the frame strut 52 passes, as best seen in FIGS. 2 and 3. The pivot arm 26 shown in FIGS. 2 and 3 is constructed to demonstrate a pivot means appropriate for a student of a violin. Pivot arm 26 therefore has four positioning notches aligned sequentially, being a first positioning notch 86 closest to the pivot arm bracket 80; a second positioning notch 88 adjacent the first positioning notch 86; a third positioning notch 90 adjacent the second positioning notch 88; and, a fourth positioning notch 92, adjacent the third positioning notch 90. In FIGS. 2 and 3, the frame strut 52 is shown engaging the fourth positioning notch 92. By pivoting the pivot arm 26 away from the board 12 so the frame strut moves out of engagement with a positioning notch, a user of the stringed instrument practice bow guide 10 may thereby pivot the bow track so that a different positioning notch engages the frame strut 52. The pivot arm 26 may be fabricated of a variety of common materials, such as aluminum or steel alloys, or modern plastics.

Pivot arm 26, as shown in FIGS. 2 and 3, is constructed to aid a student of a violin, so that the four positioning notches 86, 88, 90, 92 place the longitudinal axis of the bow passage 22 of the bow track 20 in a series of four guide contact planes that approximate four string contact planes of a violin. For purposes herein, a string contact plane is defined as a plane that is both parallel to a longitudinal axis of a particular string of a stringed instrument, and is also aligned so that the string contact plane contacts only that particular string and not other strings of the stringed instrument. For example, if a right-handed student were to use the stringed instrument practice bow guide 10 shown in FIGS. 1–3, so the first positioning notch 86 engages the frame strut 52, that would position a bow sliding back and forth along the longitudinal axis of the bow passage 22 in a first guide contact plane that approximates a string contact plane for an "E-string" of a violin. Positioning the second positioning notch 88 to engage the frame strut 52 moves the longitudinal axis of the bow passage 22 so the bow moves in a second guide contact plane approximating a string contact plane of an "A-string" of a violin. Similarly, the third and fourth positioning notches 90, 92 position the longitudinal axis of the bow passage 22 in third and fourth guide contact planes that respectively approximate string contact planes for an "D-string" and a "G-string" of a violin.

Additionally, because the engagement of the four positioning notches 86, 88, 90, 92 of pivot arm 26 with the frame strut is secured by only the force of gravity (as opposed to a screw-type of fastener), a student need only use a finger of the student's hand holding the bow to lift the pivot arm 26 up, away from the board 12, and thereafter pivot the bow, which in turn pivots the bow track to another guide contact plane, at which time the student lets the pivot arm 26 drop to allow the frame strut 52 to engage a different positioning notch.

In a particular embodiment of the stringed instrument practice bow guide 10, the frame strut 52 and positioning notches 86, 88, 90, 92 of the pivot arm 26 form a pivot pressure release means for allowing a student to apply pressure through the bow 24 and therefore the bow track 20 in a direction perpendicular to the transverse axis of the board 12 to cause the pivot arm 26 to move from engagement of one of its positioning notches with the frame strut 52 to another positioning notch. The pivot pressure release means includes the frame strut 52 and positioning notches 86, 88, 90, 92 of the pivot arm being cooperatively dimensioned to facilitate sliding of the pivot arm 26 from engagement of one of its positioning notches with the frame strut 52 to engagement with another notch by, for example, the positioning notches being defined by sloped cut outs in the pivot arm 26, or by the frame strut 52 being cylindrical and having a cross-sectional diameter approximately two times a depth of any of the positioning notches, or by any cooperatively dimensioned notch and strut arrangements well known in the art for disengagement upon application of pressure perpendicular to a longitudinal axis of the strut, such as commonly found in pivoting gate latches, etc. In use of the pivot pressure release embodiment, the student may practice movement of the bow 24 between different guide contact planes without movement of the student's arm, hands or fingers from the bow, and without putting the stringed instrument aside for adjustments.

As can be seen, the stringed instrument practice bow guide 10 of the present invention constrains movement of the bow 24 passing back and forth through the bow passage 22 of the bow track 20 in a direction that is perpendicular to the longitudinal axis of the board 12 that approximates a longitudinal axis of a string of a stringed instrument, which constraining movement is referred to as maintaining the bow within a stroke plane of the board or string. Similarly, positioning the bow track 20 so that the longitudinal axis of the bow passage 22 is in one of the four guide contact planes constrains movement of the bow 24 passing back and forth through the bow passage 22 within a guide contact plane that approximates a string contact plane of a stringed instrument. Consequently, the stringed instrument practice bow guide 10 of the present invention assists the student of stringed instrument by constraining movement of an actual bow 24, or imitation bow (not shown) such as a rod, within close approximations of the string contact and stroke planes of actual stringed instruments. By practicing such constrained movements, the student develops proper bow movement without aggravating noises arising from improper string crossings.

While the present invention has been described and illustrated with respect to a particular construction of a stringed instrument practice bow guide, it will be understood by those skilled in the art that the present invention is not limited to this particular embodiment. For example, the pivot means for adjustably securing the bow track 20 in a variety of fixed positions relative to the transverse axis of the board 12 may include common mechanical arms with screw fasteners. Similarly, the bow track means may include a cylinder that does not open, and simply allows an imitation or real bow to slide back and forth through a bow passage 22 defined by the cylinder. Accordingly, reference should be made primarily to the attached claims rather than the foregoing specification to determine the scope of the invention.

What is claimed is:

1. A stringed instrument practice bow guide for assisting students of stringed instruments in learning proper bow movement of a bow of a stringed instrument, comprising:

a. a board having a finger end and an opposed brace end;
   b. a frame secured to the board;
   c. a bow track means secured to the frame defining a bow passage for slidably securing the bow of the stringed instrument within the bow passage, the bow track means being pivotally secured to the frame so that the bow passage is in a fixed, right-angle relationship with respect to a longitudinal axis of the board and the bow passage adjustably pivots with respect to a transverse axis of the board; and
   d. a pivot arm extending between the bow track and the frame, the pivot arm defining a plurality of positioning notches within a notch cavity through which a frame strut of the frame passes so that whenever the frame strut engages a first positioning notch a longitudinal axis of the bow passage is adjustably secured within a first guide contact plane and whenever the frame strut engages a second positioning notch, the longitudinal axis of the bow passage is adjustably secured within a second guide contact plane.

2. The stringed instrument bow practice guide of claim 1 wherein the pivot arm includes a pivot pressure release means for allowing the student to apply pressure to the bow within the bow track in a direction perpendicular to the transverse axis of the board so that the pivot arm moves from engagement of one of its positioning notches with the frame strut to another positioning notch.

3. The stringed instrument practice bow guide of claim 2, wherein the pivot pressure release means comprises the frame strut being cylindrical and having a cross-sectional diameter that is approximately twice as long as a depth of any of the positioning notches.

4. The stringed instrument practice bow guide of claim 1, wherein the pivot arm defines positioning notches at opposed ends of the notch cavity.

5. A stringed instrument practice bow guide for assisting students of stringed instruments in learning proper bow movement of a bow of a stringed instrument, comprising:

a. a board having a finger end and an opposed brace end;
   b. a frame secured to the board;
   c. a bow track means secured to the frame defining a bow passage for slidably securing the bow of the stringed instrument within the bow passage, the bow track means being pivotally secured to the frame so that the bow passage is in a fixed, right-angle relationship with respect to a longitudinal axis of the board and the bow passage adjustably pivots with respect to a transverse axis of the board; and
   d. a pivot means secured between the bow track and the frame for adjustably securing the bow track to the frame in a plurality of fixed positions; wherein the frame comprises a base plate that defines a base plate slot for removably securing the frame to a reversible receiving bar of a frame mounting bracket secured to the board; a "U"-shaped track mount secured to the base plate having a first arm and a second arm and a frame strut passing between the first and second arms at a lower end of the track mount adjacent the base plate; and a first pivot rod passing through the first and second arms at an upper end of the track mount opposed to its lower end, the first pivot rod engaging a mount throughbore of a bow track bracket secured to the bow track to pivotally secure the bow track to the frame.

6. The stringed instrument practice bow guide of claim 5, wherein the frame mounting bracket is removably secured to the board in one of a plurality of paired mounting holes so that the mounting bracket and its affixed frame may be positioned in different positions along the board.

7. The stringed instrument practice bow guide of claim 6, wherein the board defines a track storage box for storing the frame and bow track upon removal from the mounting bracket.

8. A stringed instrument practice bow guide for assisting students of stringed instruments in learning proper bow movement of a bow of a stringed instrument, comprising:

a. a board having a finger end and an opposed brace end;
   b. a frame secured to the board;
   c. a bow track secured to the frame including a support housing secured to the frame and an enclosure housing pivotally secured to the support housing that pivots open to admit the bow and pivots closed around the bow to define a bow passage that slidably secures the bow within the bow passage, the bow track being pivotally secured to the frame so that the bow passage is in a fixed, right-angle relationship with respect to a longitudinal axis of the board and the bow passage adjustably pivots with respect to a transverse axis of the board; and
   d. a pivot means secured between the bow track and the frame for adjustably securing the bow track to the frame in a plurality of fixed positions.

9. The stringed instrument practice bow guide of claim 8, wherein the support enclosure includes a roller axle supporting a slide roller within the bow passage that supports a rod of the bow so that friction upon movement of the bow within the bow passage is reduced.

10. The stringed instrument practice bow guide of claim 8, wherein the pivot means includes a pivot arm extending between the bow track and the frame, the pivot arm defining a plurality of positioning notches within a notch cavity through which a frame strut of the frame passes so that whenever the frame strut engages a first positioning notch a longitudinal axis of the bow passage is adjustably secured within a first guide contact plane and whenever the frame strut engages a second positioning notch, the longitudinal axis of the bow passage is adjustably secured within a second guide contact plane.

11. The stringed instrument bow practice guide of claim 10 wherein the pivot means includes a pivot pressure release means for allowing the student to apply pressure to the bow within the bow track in a direction perpendicular to the transverse axis of the board so that the pivot arm moves from engagement of one of its positioning notches with the frame strut to another positioning notch.

12. The stringed instrument practice bow guide of claim 11, wherein the pivot pressure release means comprises the frame strut being cylindrical and having a cross-sectional diameter that is approximately twice as long as a depth of any of the positioning notches.

13. The stringed instrument practice bow guide of claim 8, wherein the frame comprises a base plate that defines a base plate slot for removably securing the frame to a reversible receiving bar of a frame mounting bracket secured to the board; a "U"-shaped track mount secured to the base plate having a first arm and a second arm and a frame strut passing between the first and second arms at a lower end of the track mount adjacent the base plate; and a first pivot rod passing through the first and second arms at an upper end of the track mount opposed to its lower end, the first pivot rod engaging a mount throughbore of a bow track bracket secured to the support housing to pivotally secure the bow track to the frame.

14. A stringed instrument practice bow guide for assisting students of stringed instruments in learning proper bow movement of a bow of a stringed instrument, comprising:

a. a board having a finger end and an opposed brace end;

b. a frame secured to the board;

c. a bow track secured to the frame including a support housing secured to the frame and an enclosure housing pivotally secured to the support housing that pivots open to admit the bow and pivots closed around the bow to define a bow passage that slidably secures the bow within the bow passage, the bow track being pivotally secured to the frame so that the bow passage is in a fixed, right-angle relationship with respect to a longitudinal axis of the board and the bow passage adjustably pivots with respect to a transverse axis of the board; and d. a pivot arm extending between the support housing and the frame, the pivot arm defining a plurality of positioning notches within a notch cavity through which a frame strut of the frame passes so that whenever the frame strut engages a first positioning notch a longitudinal axis of the bow passage is adjustably secured within a first guide contact plane and whenever the frame strut engages a second positioning notch, the longitudinal axis of the bow passage is adjustably secured within a second guide contact plane.

15. The stringed instrument practice bow guide of claim 14, wherein the frame strut is cylindrical and has a cross-sectional diameter that is approximately twice as long as a depth of any of the positioning notches.

16. The stringed instrument practice bow guide of claim 15, wherein the support enclosure includes a roller axle supporting a slide roller within the bow passage that supports a rod of the bow so that friction upon movement of the bow within the bow passage is reduced.

17. The stringed instrument practice bow guide of claim 16, wherein the board defines a track storage box for storing the frame and bow track upon removal from the mounting bracket.

18. The stringed instrument practice bow guide of claim 17, wherein the frame comprises a base plate that defines a base plate slot for removably securing the frame to a reversible receiving bar of a frame mounting bracket secured to the board; a "U"-shaped track mount secured to the base plate having a first arm and a second arm and a frame strut passing between the first and second arms at a lower end of the track mount adjacent the base plate; and a first pivot rod passing through the first and second arms at an upper end of the track mount opposed to its lower end, the first pivot rod engaging a mount throughbore of a bow track bracket secured to the support housing to pivotally secure the bow track to the frame.

19. The stringed instrument practice bow guide of claim 18, wherein the frame mounting bracket is removably secured to the board in one of a plurality of paired mounting holes so that the mounting bracket and its affixed frame may be positioned in different positions along the board.

* * * * *